United States Patent [19]

Scull, Jr.

[11] 3,862,835

[45] Jan. 28, 1975

[54] PROCESS FOR PRODUCING ALUMINIUM

[75] Inventor: Herbert M. Scull, Jr., Baton Rouge, La.

[73] Assignee: Ethyl Corporation, Richmond, Va.

[22] Filed: Aug. 30, 1973

[21] Appl. No.: 393,009

Related U.S. Application Data

[63] Continuation-in-part of Ser. No. 215,804, Jan. 6, 1972, Pat. No. 3,784,372, which is a continuation-in-part of Ser. No. 50,878, June 29, 1970, abandoned.

[52] U.S. Cl................................................. 75/68 C
[51] Int. Cl............................................. C22b 21/00
[58] Field of Search .......... 75/68 C, .5 R, .5 A, .5 B

[56] References Cited
UNITED STATES PATENTS
3,784,372   1/1974   Scull, Jr. ............................. 75/68 C

*Primary Examiner*—C. Lovell
*Assistant Examiner*—M. J. Andrews
*Attorney, Agent, or Firm*—Donald L. Johnson; John F. Sieberth; Paul H. Leonard

[57] ABSTRACT

In the production of aluminum by thermally decomposing an alkylaluminum compound with the aid of suitable apparatus, a problem arises with the fouling of such apparatus by the adherence of aluminum particles. Such fouling is reduced by conducting the decomposition within a neutral liquid solvent which is non-reactive with the alkylaluminum compound and the aluminum produced therefrom and which is at a high temperature well above the temperature at which the compound normally decomposes in the pure state. The neutral liquid solvent is placed in a container and contacted with a heated solid heat transfer member. Transfer of the heat from the member is established to raise the temperature of the neutral liquid solvent to a temperature at least above the decomposition temperature of the alkylaluminum compound to be subsequently added thereto. Transfer of the heat is then terminated to permit the heat transfer member to cool. The alkylaluminum compound is added to the solvent to effect its decomposition with reduced adherence of the resulting aluminum to the heat transfer member. Preferably, the solvent is agitated while the alkylaluminum compound is added. To further minimize this fouling a continuous process is envisaged where the decomposition occurs in a series of stirred reactors. The aluminum alkyl is fed to the first reactor of the series and the solvent in the last reactor is depleted of alkylaluminum compound. This depleted solvent is passed through a heat exchanger and then back to the first reactor. This depleted solvent would not cause fouling of the heat exchanger.

15 Claims, 1 Drawing Figure

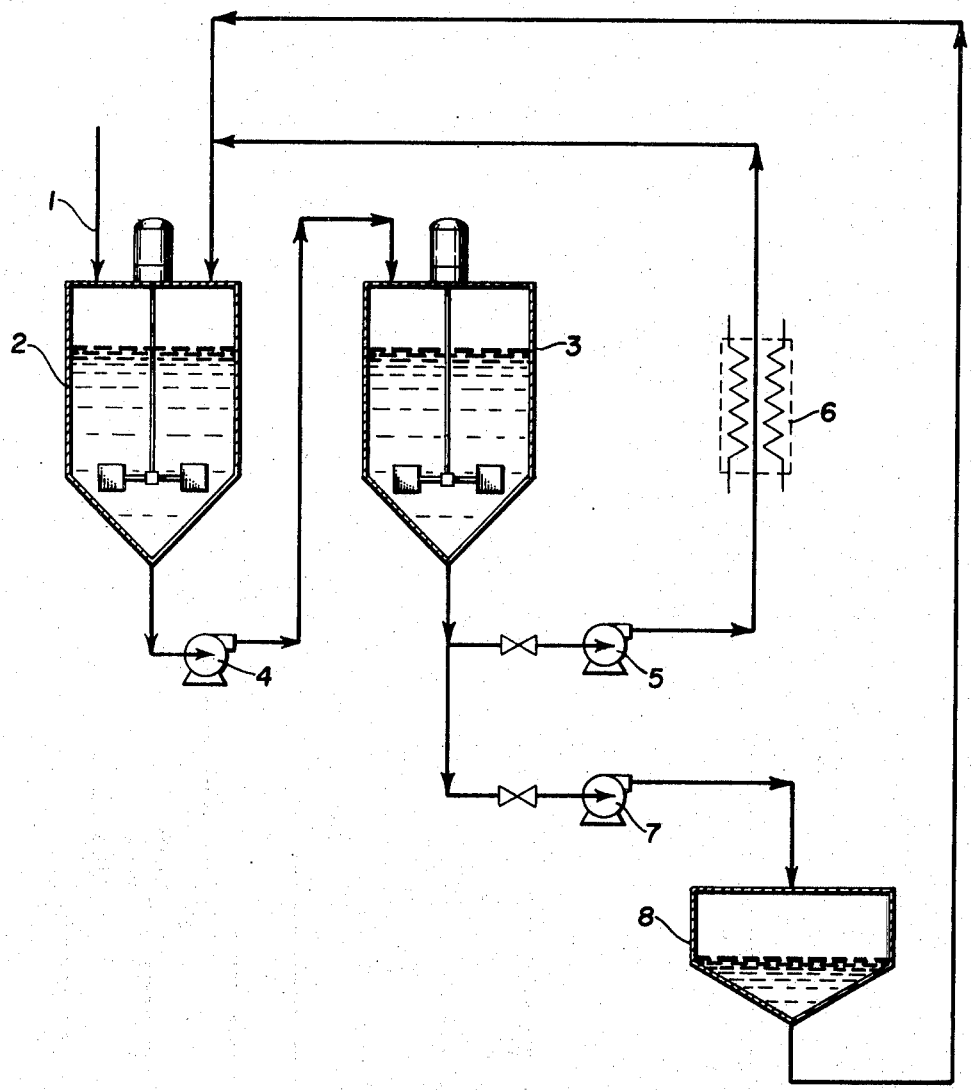

PROCESS FOR PRODUCING ALUMINIUM

CROSS-REFERENCES TO RELATED APPLICATION

This application is a continuation-in-part of U.S. application Ser. No. 215,804, filed Jan. 6, 1972 now U.S. Pat. No. 3,784,372, which in turn is a continuation-in-part of application Ser. No. 50,878, filed June 29, 1970, now abandoned.

U.S. Pat. Nos. 3,170,787; 3,155,493 and 2,843,474 teach that high purity aluminum may be produced by thermal decomposition or pyrolysis of an alkylaluminum compound and/or its complex compound. However, it has been found in the practice of the processes of these patents that a serious problem develops with the deposition of aluminum particles upon the surfaces of the reactor and heat exchange apparatus. Such depositions not only prevent the recovery of the aluminum, but also reduce the efficiency of heat transfer. This not only limits the process to being conducted as a batch operation, since it must frequently be shut down to clean out the reactor and heat exchange apparatus, but renders the process generally uneconomical. In accordance with the present invention a process has been developed which is highly economical and which successfully overcomes the above problems. A more complete description of this process follows.

SUMMARY OF THE INVENTION

The present invention involves a process for the production of aluminum by thermally decomposing an alkylaluminum compound utilizing suitable apparatus wherein the improvement resides in substantially reducing the quantity of aluminum which adheres to the apparatus by conducting the decomposition within a liquid solvent which is substantially non-reactive with the alkyl-aluminum compound and is at a temperature substantially above the temperature at which the compound decomposes in the pure state.

BRIEF DESCRIPTION OF THE DRAWING

The drawing is a schematic view of the reactor system of the present invention.

DESCRIPTION OF THE PREFERRED EMBODIMENTS

The present invention provides for the production of aluminum by a process involving the thermal decomposition of alkylaluminum compounds which avoids a serious problem experienced by the prior art, namely, the adherence of aluminum particles to the exposed walls of the reactor, heat exchanger, and other associated apparatus. This sticking problem makes the recovery of aluminum more difficult and expensive and renders the process uneconomical.

To accomplish the purpose of this invention, a process is provided for manufacturing aluminum which involves heating an alkylaluminum compound having the formula $(R'R^2CH-CH_2)_2AlX$, wherein $R^1$ and $R^2$ are either alkyl radicals or hydrogen and X is either hydrogen, $R^1R^2CH-CH-$ radical, and/or a complex compound thereof, up to a temperature at which the compound is decomposed, in a neutral solvent medium. Among the alkylaluminum compounds as above generally identified, di-n-propylaluminum hydride, triisobutylaluminum, diisobutylaluminum hydride, triethylaluminum, diethylaluminum hydride and tri-n-propylaluminum are preferred. However, the $R^1$ and $R^2$ radicals, which may be the same or different, may be other alkyl radicals having up to 10 carbon atoms. For example, tri-n-butylaluminum, di-n-butylaluminum hydride, trihexylaluminum and dihexylaluminum hydride are suitable though less preferred.

The neutral solvent employed in this invention is able to dissolve the alkylaluminum compound, has a boiling point higher than the temperature at which the compound decomposes in the pure state, and has a sufficient thermal stability at that temperature. Exemplary of the solvent are aliphatic, alicyclic and aromatic hydrocarbons, or mixtures thereof, such as various petroleum fractions boiling above 300°C, paraffin oil, alkylbenzenes, alkylnaphthalenes, diphenyl and the like, all boiling above 300°C. Among these, paraffin oil is preferred.

In accordance with the process of this invention the alkylaluminum compound is heated to a temperature at which it decomposes in the neutral solvent. Preferably, the alkylaluminum compound is added to the solvent which is already heated to a temperature at which the compound is readily decomposed. The temperature is desirably well above the temperature at which the alkylaluminum compound normally decomposes in the pure state. Generally, the decomposition reaction of the invention starts from about 250°–350°C, depending upon the particular alkylaluminum compound being decomposed, but the heating temperature may vary preferably within the range of from about 310°C to about 500°C. Such relatively high temperatures reduce sticking of the aluminum particles to expose reaction apparatus. Lower temperatures tend to produce excessive sticking of the aluminum to surfaces, especially heated surfaces.

Fouling of heated surfaces which supply the heat of decomposition is also reduced with or without high temperatures if a portion of the liquid from which all or nearly all of the aluminum alkyl has been removed is withdrawn as a side stream, then heated and returned to the remaining solvent. Removal of the aluminum alkyl is effected by thermally decomposing or reacting the aluminum alkyls in a series of two or more reactors as shown in the drawing. The alkyl is fed through line 1 to the first reactor 2. A stream from the first reactor is fed to the second reactor 3 through pump 4. A stream from the second reactor which is depleted of aluminum alkyl is passed through the heater 6 by pump 5 and then is returned to the first reactor. This solvent, heated to an elevated temperature, supplies the heat of reaction for the two reactors. A second side stream must be passed either continuously or intermittently through a filter or other solid liquid separating device 8 by pump 7 and then back to the reactors. In this way the building up of large quantities of solid aluminum in the solvent is avoided and the product aluminum is easily removed. The number of reactors required to remove substantially all of the aluminum alkyl from the solvent depends on the rate of decomposition which depends on the particular alkyl and the temperature. Once the aluminum alkyl has been removed from the liquid solvent, the solvent may be heated as high as desired up to its boiling point or even to a vapor. If the solvent is heated to a vapor, it is evident that the stream to the heater must then be filtered to remove all aluminum solids. It is also evident that advantage is taken of the heat of vaporization of the solvent.

For all embodiments of the invention it is desirable that the neutral solvent be agitated. Thus, the liquid medium may be steadily agitated by an impeller, propeller, turbine or the like. The idea behind this is not only to uniformly disperse the alkyl-aluminum compound into the solvent once it is added, but also to maintain the solvent in motion at least in areas adjacent to the containing apparatus. Such motion prevents the adherence of particles of aluminum to the walls of the apparatus as they are formed. Regardless of the means employed, the motion imparted to the liquid serves to prevent adherence of the aluminum particles to the reaction apparatus and in combination with other factors of this invention effectively reduces fouling.

Having thus described the invention, the following examples are presented as being descriptive and not limiting of the present invention.

EXAMPLE I

710 Grams of TNPA (tri-n-propylaluminum) were charged to a 1-liter glass autoclave and heated to 240°C by means of an internal electrically heated coil. The TNPA was agitated by two turbine agitators at 1,000 RPM. TNPA was metered into the reactor and the evolved gases were passed through a wet test meter to measure the rate of decomposition. Over a period of 50 minutes, 2.55 gram-moles of TNPA were added and 11.5 gram-moles of gas were evolved. The aluminum was formed primarily as a tenacious paste on the heating coil with a lesser amount sticking to the reaction walls. Very little was dispersed in the liquid.

EXAMPLE II

270 Grams of paraffin solvent and 100 grams of TNPA were charged to a 1-liter glass autoclave and heated to 250°C by means of an internal electrically heated coil. The solvent was agitated by two turbine agitators at 1,000 RPM. TNPA was metered into the reactor and the evolved gases were passed through a wet test meter to measure the rate of decomposition. Over a period of 30 minutes, 0.67 gram-moles of TNPA were added and 3.0 gram-moles of gas were evolved. The aluminum was formed primarily as a tenacious paste on the heating coil with a lesser amount sticking to the reactor walls. The solvent contained very little dispersed aluminum.

EXAMPLE III

453 Grams of paraffin solvent were added to a 1-liter stainless steel reactor and heated to 320°C by means of an internal electrically heated coil. The solvent was agitated by two turbine agitators at 1,000 RPM. Tri-n-propylaluminum containing some di-n-propylaluminum hydride was metered into the reactor and the evolved gases were passed through a wet gas meter to measure the rate of decomposition. Over a period of 38 minutes 0.82 gram-moles of tri-n-propylaluminum were added and 3.3 gram-moles of gas were evolved. The aluminum formed was primarily dispersed in the solvent. Only small quantities adhered to the heating surface and reactor walls and these were easily removed.

EXAMPLE IV

454 Grams of paraffin solvent were added to a 1-liter reactor and heated to 390°C as in Example I with similar agitation. The heating coil was turned off and its temperature was allowed to cool to reactor temperature. Tri-n-propylaluminum was then added, the heat capacity of the solvent thereby supplying the heat of reaction. Tri-n-propylaluminum addition was stopped when the temperature of the solvent reached 270°C. Over a period of 24 minutes 0.58 gram-moles of tri-n-propylaluminum was added and the total gas evolved measured 2.15 gram-moles. The results were similar to Example III.

EXAMPLE V

Example III is repeated except triisobutylaluminum is substituted for tri-n-propylaluminum and a decomposition temperature of 350°C is utilized. Good results are achieved.

EXAMPLE VI

Tri-n-propylaluminum is fed at the rate of 13 pounds per hour to a five-gallon steel reactor which contains approximately 3.75 gallons of paraffin solvent at a temperature of 310°C. The solvent is agitated by a turbine agitator at 2,500 RPM. A side stream is taken off the reactor at the rate of two gallons per minute and passed to a second five-gallon steel reactor which also contains approximately 3.75 gallons of paraffin solvent at a temperature of 310°C which is agitated by a turbine agitator at 2,500 RPM. Decomposition of the tri-n-propylaluminum is completed in the second reactor. A side stream is taken off the second reactor at the rate of two gallons per minute and passed to a heat exchanger where the temperature of the stream is elevated to 320°C. This heated stream is then admitted to the first reactor. A second side stream is taken from the second reactor and filtered to remove 2.25 pounds per hour of aluminum particles. The filtered solvent is returned to the first reactor. Good results are obtained.

What is claimed is:

1. A process for the production of aluminum by thermally decomposing an alkylaluminum compound comprising: introducing a neutral liquid solvent into a container, contacting the neutral liquid solvent with a solid heat transfer member, transferring heat from the transfer member to the solvent in a sufficient amount to raise the temperature of the solvent to a temperature above the decomposition temperature of the alkylaluminum compound to be decomposed, terminating the transfer of heat and permitting the heat transfer member to cool, and adding the alkylaluminum compound to the solvent in the container to effect its decomposition with reduced adherence of the resulting aluminum to walls of the container and to the heat transfer member.

2. The process of claim 1, wherein the solvent in the container is agitated during the addition of the alkylaluminum compound.

3. The process of claim 1, wherein the decomposition is conducted at a temperature of at least about 270°C.

4. The process of claim 1, wherein the alkylaluminum compound is tri-n-propylaluminum.

5. The process of claim 1, wherein the solvent is a paraffin oil.

6. The process of claim 1, wherein the solvent is heated to a temperature of at least 300°C.

7. The process of claim 1, wherein the temperature of the solvent is higher than that of the container during the addition of the alkylaluminum compound.

8. The process of claim 1, wherein the solvent is heated to a temperature of from about 310°C to about 500°C.

9. In a process of thermally decomposing an alkylaluminum compound in a container of heated liquid essentially inert to the compound and to aluminum, to form metallic aluminum, the improvement according to which the liquid in the container is contacted with a heated solid heat transfer member, the transfer of the heat from the member is established to raise the temperature of the liquid to at least above the decomposition temperature of the alkylaluminum compound to be decomposed, the transfer of heat is then terminated to permit the heat transfer member to cool, and the alkylaluminum compound added to the liquid in the container to effect its decomposition with reduced adherence of the resulting aluminum to the heat transfer member.

10. The combination of claim 9 in which the liquid in the container is agitated while the alkylaluminum compound is added.

11. The process of claim 9, wherein the decomposition is conducted at a temperature of at least about 250°C.

12. The process of claim 9, wherein the decomposition is conducted at a temperature of from about 310°C to about 390°C.

13. The process of claim 9, wherein the alkylaluminum compound is tri-n-propylaluminum.

14. The process of claim 9, wherein the liquid is a paraffin oil.

15. The process of claim 9, wherein the solvent is heated to a temperature of at least 300°C.

* * * * *